No. 718,613. PATENTED JAN. 20, 1903.
C. H. FIELD.
MACHINE FOR MAKING WATCHCASE CENTERS OR SIMILAR ARTICLES.
APPLICATION FILED JULY 17, 1901.
NO MODEL. 5 SHEETS—SHEET 1.

WITNESSES: INVENTOR:
Harry J. Garreau Charles H. Field
Henry E. Reynolds BY S. Schofield
ATTY.

No. 718,613. PATENTED JAN. 20, 1903.
C. H. FIELD.
MACHINE FOR MAKING WATCHCASE CENTERS OR SIMILAR ARTICLES.
APPLICATION FILED JULY 17, 1901.
NO MODEL. 5 SHEETS—SHEET 2.

WITNESSES: INVENTOR:

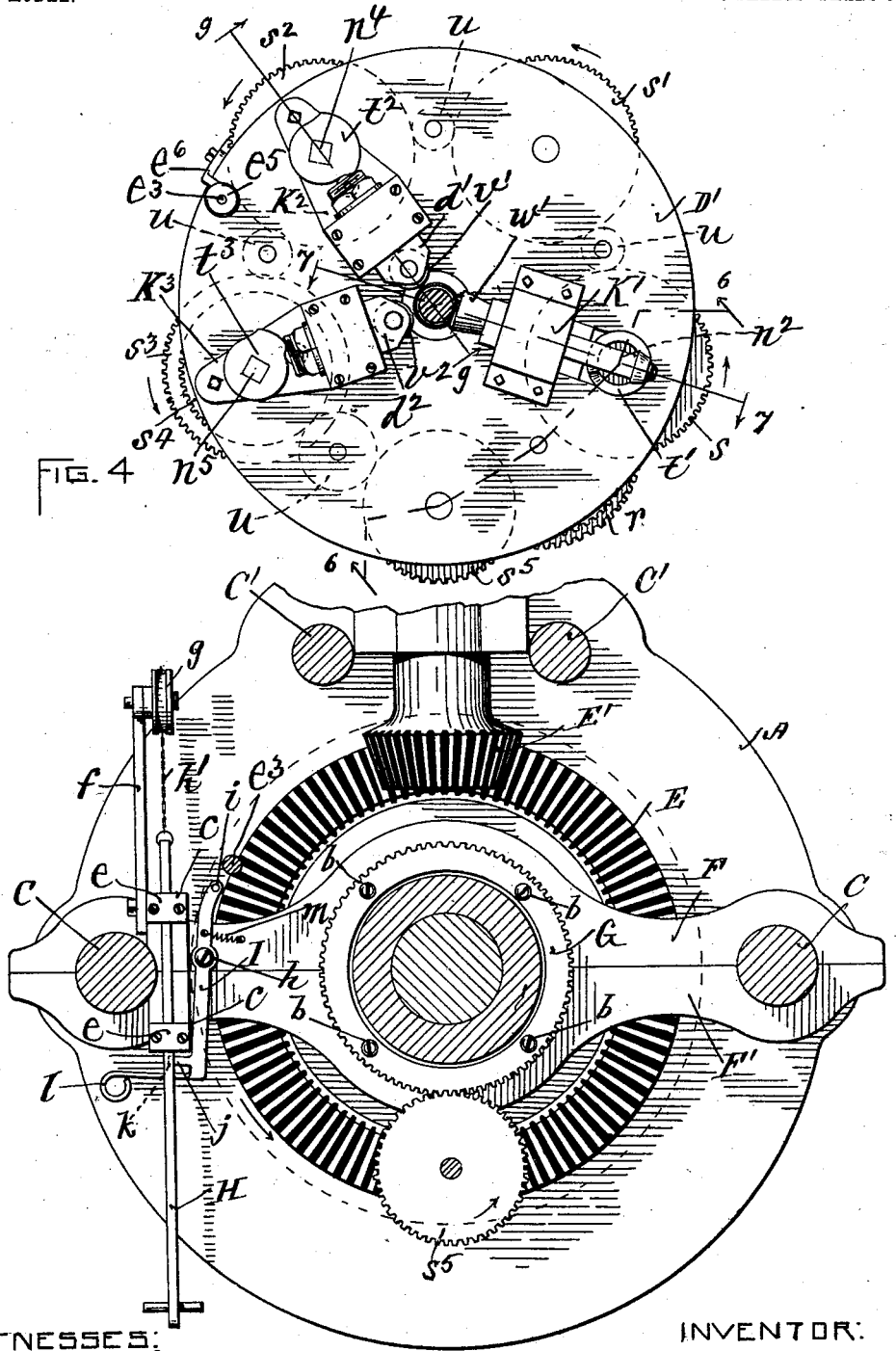

No. 718,613. PATENTED JAN. 20, 1903.
C. H. FIELD.
MACHINE FOR MAKING WATCHCASE CENTERS OR SIMILAR ARTICLES.
APPLICATION FILED JULY 17, 1901.
NO MODEL. 5 SHEETS—SHEET 4.
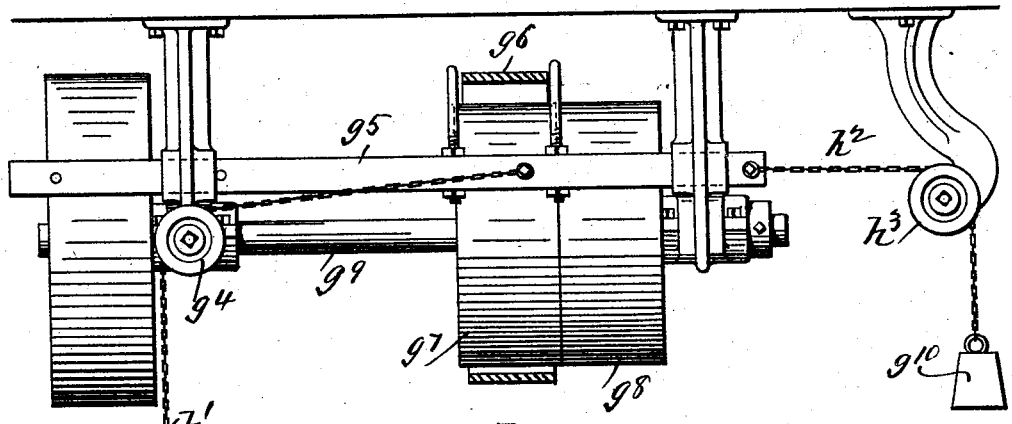
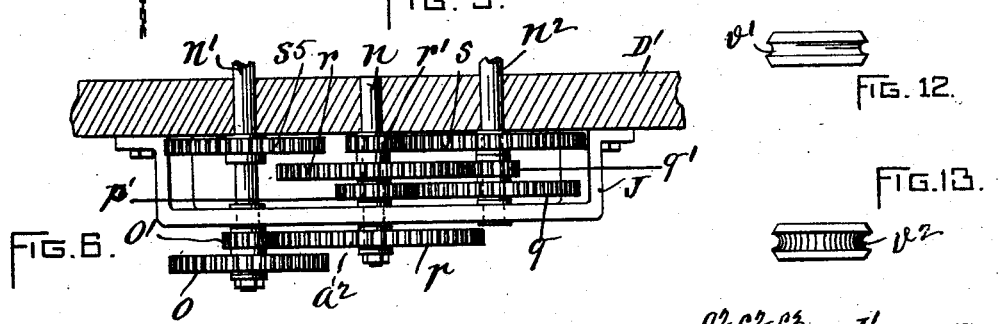
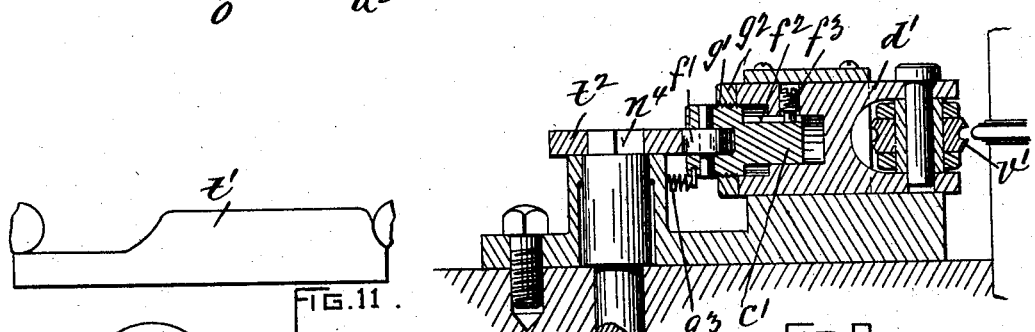
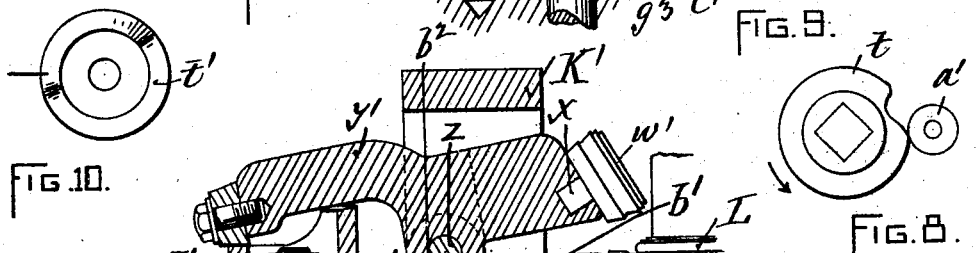
WITNESSES: INVENTOR:
Charles H. Field
By S. Scholfield
ATTY.

No. 718,613. PATENTED JAN. 20, 1903.
C. H. FIELD.
MACHINE FOR MAKING WATCHCASE CENTERS OR SIMILAR ARTICLES.
APPLICATION FILED JULY 17, 1901.
NO MODEL. 5 SHEETS—SHEET 5.
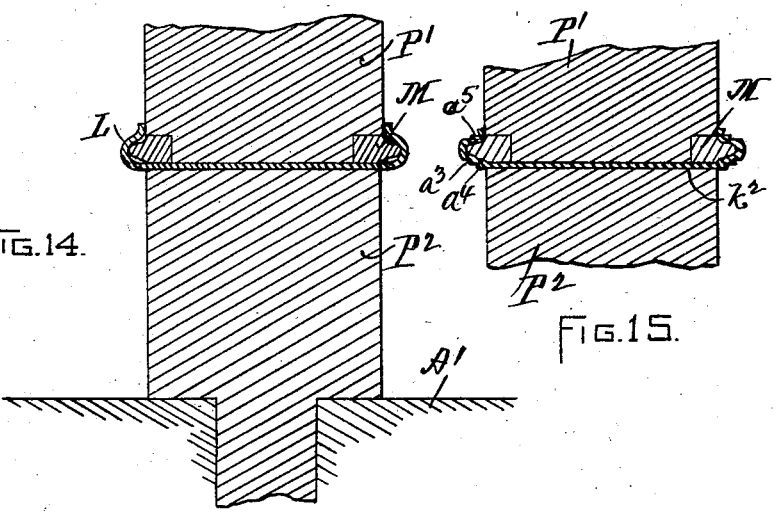
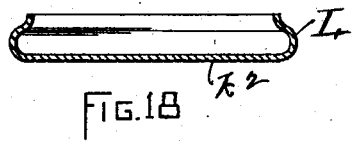
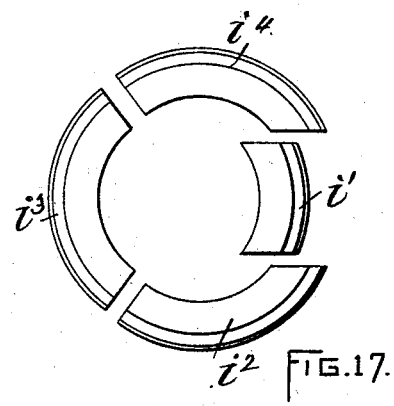
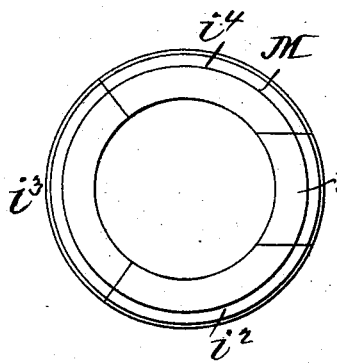
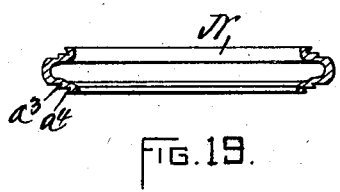
WITNESSES:
Harry J. Garceau
Henry E. Reynolds
INVENTOR:
Charles H. Field
BY L. Schofield.
ATTY.

UNITED STATES PATENT OFFICE.

CHARLES H. FIELD, OF PROVIDENCE, RHODE ISLAND.

MACHINE FOR MAKING WATCHCASE-CENTERS OR SIMILAR ARTICLES.

SPECIFICATION forming part of Letters Patent No. 718,613, dated January 20, 1903.

Application filed July 17, 1901. Serial No. 68,681. (No model.)

*To all whom it may concern:*

Be it known that I, CHARLES H. FIELD, a citizen of the United States, residing at Providence, in the State of Rhode Island, have invented a new and useful Improvement in Machines for Making Watchcase-Centers or Similar Articles, of which the following is a specification.

My invention consists in the improved construction of a machine for automatically rolling a preliminary cup-formed blank to form a watchcase-center or similar article, as hereinafter fully set forth.

Figure 1:
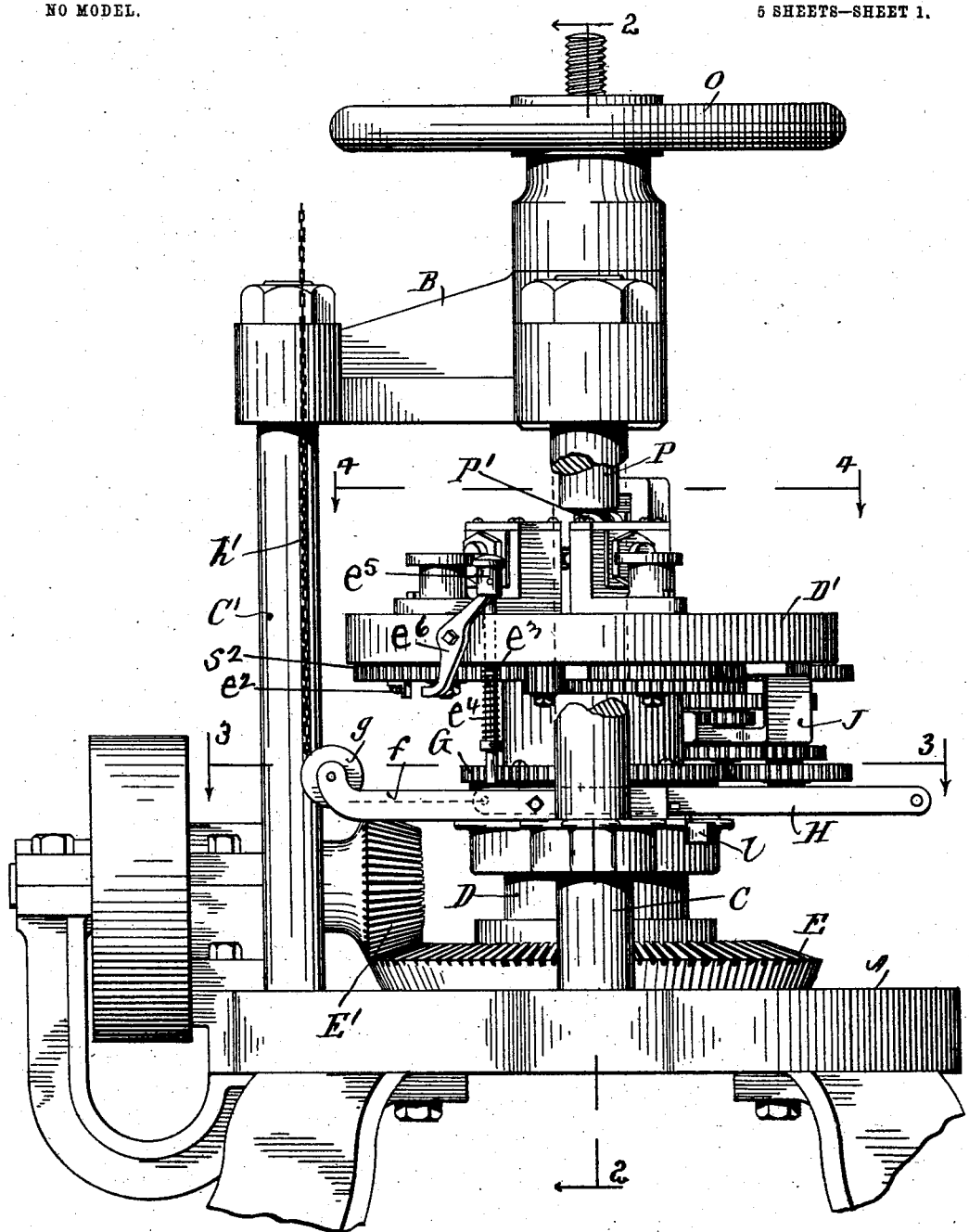
Figure 2:
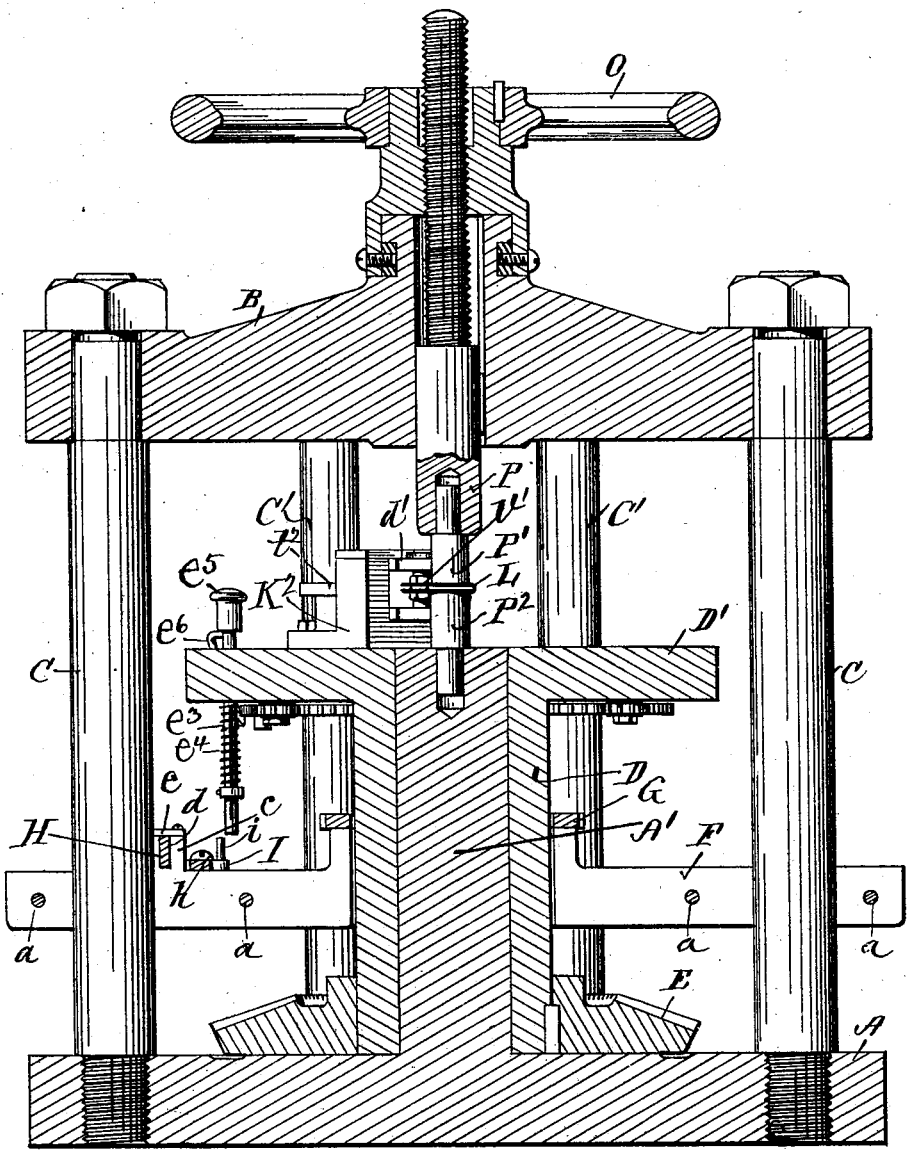

In the accompanying drawings, Figure 1 represents a side elevation of a machine embodying my invention. Fig. 2 represents a vertical section taken in the line 2 2 of Fig. 1. Fig. 3 represents a section taken in the line 3 3 of Fig. 1. Fig. 4 represents a section taken in the line 4 4 of Fig. 1. Fig. 5 represents a side view of the counter-shaft for driving the machine. Fig. 6 represents a detail section taken in the line 6 6 of Fig. 4. Fig. 7 represents an enlarged detail section taken in the line 7 7 of Fig. 4, showing the roll-holding jaws. Fig. 8 represents a top view of the cam which serves to carry the roll-holding jaws forward. Fig. 9 represents an enlarged section taken in the line 9 9 of Fig. 4. Fig. 10 represents a top view of the cam which serves to close the said jaws. Fig. 11 represents the outspread peripheral surface of the said cam for closing the jaws. Fig. 12 represents an edge view of the plain-grooved roll. Fig. 13 represents an edge view of the milled-grooved roll. Fig. 14 represents an axial section of the removable core upon which the watchcase-center is to be formed and of the press-dies for holding the same with the inserted preliminary blank. Fig. 15 represents an axial section of the same, showing the completely-rolled blank for the watchcase-center. Fig. 16 represents a plan view of the removable core upon which the watchcase-center is to be formed. Fig. 17 represents the same when the parts are separated from each other. Fig. 18 represents an axial section of the provided cup-formed blank from which the watchcase-center is to be formed. Fig. 19 represents an axial section of the finished center.

In the drawings, A represents the bed-plate of the machine, and B the top piece, which latter is supported in position by means of the posts C C C' C', the said top piece being provided with the hand-wheel nut O, which serves to actuate the screw-threaded plunger P, provided at its lower end with the upper holding-die P'. The bed-plate A is provided with the upwardly-projecting stem A', upon which is loosely placed the sleeve D, provided at its upper end with a flange D', which forms a rotary table, and to the lower end of the sleeve D is secured the bevel-gear E, which engages with the pinion E' upon the driving-shaft of the machine, and at the upper end of the stem A' is placed the lower holding-die $P^2$. To the posts C C are clamped the frame-pieces F F' by means of the screws $a$ $a$, and to the said frame-pieces is secured the stationary gear G by means of the screws $b$ $b$. The frame-pieces F F' are each provided with a lug $c$ $c$, having a groove $d$, adapted to receive the sliding bar H, the said bar being held in the said groove by means of the caps $e$ $e$, and to the side of the lug $c$ of the frame-piece F is bolted the arm $f$, the outer end of which is provided with the sheave $g$. To the frame-piece F is pivoted the catch-lever I at the screw-stud $h$, the said lever being provided at one end with the upwardly-extending pin $i$ and at the opposite end with the catch projection $j$, which engages with a notch $k$, made in the side of the sliding bar H, and also provided with the operating-handle $l$, the said catch projection $j$ being held in engagement with the side of the bar H by means of the spring $m$. To the under side of the table D' is bolted the bracket J, adapted to support the lower ends of the upright shafts $n'$ $n^2$, which are also journaled in the table D', and upon the lower end of the shaft $n'$ is loosely placed the connected gear and pinion $o$ $o'$. The said gear $o$ engages with the stationary gear G, and the pinion $o'$ engages with the gear $r$, connected with the pinion $r'$ by means of a sleeve $a^2$, which extends through the bracket J and is loosely held upon the fixed stud $n$. The pinion $p'$ engages with the gear $q$, which, with the connected pinion $q'$, is held loosely upon the upright shaft $n^2$, and the said pinion $q'$ engages with the gear $r$, which, with the connected pinion $r'$, is held loosely upon the stud $n$. The pinion $r'$ engages with the gear $s$, secured to the upright shaft $n^2$, the foregoing train of reducing-gears being so arranged that the sleeve D, which carries the shaft $n^2$, will make a number of revolutions while the shaft $n^2$ is making a single revolution. To the upper end of the shaft $n^2$ is secured the cam $t'$, to the upper end of the shaft $n^4$ is secured the cam $t^2$, and to the upper end of the shaft $n^5$ is secured the cam $t^3$, these shafts being so geared together by means of the gears $s\ s'\ s^2\ s^3\ s^4\ s^5$ and the intermediate gears $u$ that they will each have made one revolution upon the completion of the required number of revolutions of the table D'. The grooved rolls $v'\ v^2$ for operating the median portion of the blank are held for sliding movement in the guides $K^2\ K^3$, which are bolted to the upper side of the rotary table D', and the frictionally-operated rolls $w\ w'$ for rolling the edges of the blank are held upon the inclined studs $x\ x$, secured in the ends of the levers $y\ y'$, which are pivoted upon the rod $z$, held in the fixed guide K'. Upon the squared upper end of the shaft $n^2$ is placed the cam $t$, which engages with the roller $a'$ in the sliding piece $b'$, the said sliding piece being provided with the adjusting-screw $b^2$, the point of which by engaging with the shoulder $b^3$ serves to cause the upward movement of the roll $w$ to engagement with the lower edge of the blank L to act thereon as shown in Fig. 7, the upper roll $w'$ being actuated to engagement with the upper edge of the blank L by means of the cam $t'$ at the upper end of the shaft $n^2$. The smooth-grooved roll $v'$ for operating upon the rounded median portion of the blank is loosely held for rotation at the inner end of the slide $d'$, as shown in Fig. 9, the said slide being actuated for causing the engagement of the roll with the blank by means of the cam $t^2$ at the upper end of the shaft $n^4$, the position of the roll $v'$ relatively to the said cam being made adjustable by means of the plug $c'$, which carries the antifriction-roller $f'$, the said plug being provided with a longitudinal groove $f^2$, into which the point of the screw $f^3$ enters, thus preventing the plug from turning, the said plug being also provided at its end with the screw-thread $g'$, upon which is placed the nut $g^2$, which bears against the end of the said slide, the required adjustment being made by means of the said nut $g^2$ and the tightening-screw $f^3$. The required backward movement is imparted to the slide $d'$ by means of the spiral spring $g^3$. The nurled roll $v^2$ for nurling the center is loosely held in the slide $d^2$, which is constructed like the slide $d'$ and actuated for engagement with the blank by means of the cam $t^3$, secured upon the upper end of the shaft $n^5$. To the lower side of the gear $s^2$ is secured the bracket $e^2$, and in a vertical perforation made in the table D' is placed the sliding pin $e^3$, forced downward by means of the spiral spring $e^4$ and provided at its upper end with a head $e^5$, which by the engagement therewith of the pivoted catch $e^6$ will serve to hold the sliding pin in its elevated position in opposition to the downward action of the spring, as shown in Fig. 1. The lower end of the pivoted catch lies in the path of the bracket $e^2$, so that upon the completion of a single revolution of the gear $s^2$ the resulting engagement of the bracket $e^2$ with the end of the catch will trip the latter from its engagement with the head of the bar $e^3$, thus allowing the spring $e^4$ to act to throw the said pin downward, from which position it will immediately come into engagement with the upwardly-extending pin $i$ of the catch-lever I to cause the release of the sliding bar H from catch engagement. From the end of the sliding bar H a chain $h'$ passes around the sheave $g$ and upward to the sheave $g^4$ and then to a connection with the sliding shipper-bar $g^5$ for the belt $g^6$ of the pulleys $g^7\ g^8$ of the counter-shaft $g^9$. (Shown in Fig. 5.) The shipper-bar is actuated for causing the transfer of the belt from the tight pulley $g^7$ to the loose pulley $g^8$ by means of the weight $g^{10}$ and the chain $h^2$, which passes over the sheave $h^3$, so that upon the release of the pin $e^3$ from the pivoted catch $e^6$ the belt $g^6$ will be shifted from the tight pulley $g^7$ to the loose pulley $g^8$ to stop the machine.

The removable core M, upon which the watchcase-center N, Fig. 19, is to be formed, consists of the segmental pieces $i'\ i^2\ i^3\ i^4$, arranged as shown in Fig. 16, the preliminary blank L being stamped up in the form shown in Fig. 18, and in operating the machine the core (shown in Fig. 16) is to be placed within the prepared blank L and the said blank and core placed between the upper and lower holding-dies, as shown in Fig. 14, and firmly held by screwing down the upper die. Then the machine may be set in operation by pulling the sliding bar H outward until the catch projection $j$ of the catch-lever I engages with the notch $k$ of the sliding bar, the belt $g^6$ becoming in this case shifted from the loose to the tight pulley of the counter-shaft $g^9$, and upon the initial movement of rotation of the driving-shaft of the machine the action of the cam $t$ upon the sliding piece $b'$ causes the inclined roll $w$ to be raised into engagement with the blank L, as shown in Fig. 7, to roll the lower edge portion of the blank to proper form with the undercut shoulders $a^3\ a^4$, which are to constitute the snapping edges of the watchcase-center, and when the rotary table D' has made the required number of revolutions the grooved roll $v'$ will be brought forward by means of the cam $t^2$ to round the center portion of the blank to fit the edge of the core M, upon which it is formed, and then the continued rotation of the machine will cause the downward movement of the inclined roll $w'$ to engagement with the upper edge portion of the blank to form thereon the undercut shoulder or snapping edge $a^5$, and upon the continued rotation of the machine the grooved roll $v'$ will be withdrawn from the blank and the nurling-roll $v^2$ brought forward into engagement with the blank to complete the watchcase-center by nurling the same, and upon the continued rotation of the machine the said rolls $w$, $w'$, and $v^2$ will be withdrawn, and the gear-wheel $s^2$ having made one complete revolution the bracket $e^2$ by engagement with the lower end of the pivoted catch $e^6$ releases the pin $e^3$ and causes the stopping of the machine. Then by raising the upper holding-die by means of the hand-wheel nut O the completely-rolled blank may be removed and a new blank inserted in its stead for the subsequent operation of the machine, and upon the removal of the interior web $k^2$ of the blank by means of suitable dies, either in a press or a lathe, the watchcase-center N will be completely formed, as shown in Fig. 19.

I claim as my invention—

1. In a machine for making watchcase-centers or similar articles, the combination of holding means for the blank, with a rotary table, a series of rolls mounted upon the table, and means for automatically causing the successive engagement of the said rolls with the blank during the rotation of the table, substantially as described.

2. In a machine for making watchcase-centers or similar articles, the combination of the holding-dies, and the forming-core held between the dies, with the rotary table, a train of gears carried by the table, and a series of rolls adapted for engagement with the blank, and means for effecting such engagement, substantially as described.

3. In a machine for making watchcase-centers or similar articles, the combination of the holding-dies, and the forming-core held between the dies, with the series of forming-rolls adapted to revolve around the core to form the blank, and means for automatically causing the successive engagement of the said rolls with the blank, during their movement of revolution around the forming-core, substantially as described.

4. In a machine for making watchcase-centers or similar articles, the combination of the holding-dies, and the forming-core held between the dies, with the rotary table, a train of gears carried by the table, a series of rolls adapted for engagement with the blank, a series of cams for operating the said rolls into successive engagement with the blank, and means for stopping the machine upon the completion of a single rotation of the said cams, substantially as described.

5. In a machine for making watchcase-centers or similar articles, the combination of the holding-dies, and the forming-core held between the dies, with the rotary table, and the inclined rolls mounted thereon for rolling the snapping edges upon the blank, substantially as described.

CHARLES H. FIELD.

Witnesses:
SOCRATES SCHOLFIELD,
HARRY J. GARCEAU.